(12) United States Patent
Takagi et al.

(10) Patent No.: US 8,662,686 B2
(45) Date of Patent: Mar. 4, 2014

(54) LIGHT GUIDE PLATE AND VIRTUAL IMAGE DISPLAY APPARATUS HAVING THE SAME

(75) Inventors: Masayuki Takagi, Shiojirishi (JP); Toshiaki Miyao, Matsumotoshi (JP); Takahiro Totani, Suwa (JP); Akira Komatsu, Kamiinagun (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 13/218,927

(22) Filed: Aug. 26, 2011

(65) Prior Publication Data
US 2012/0057253 A1 Mar. 8, 2012

(30) Foreign Application Priority Data
Sep. 3, 2010 (JP) ................................. 2010-197437

(51) Int. Cl.
*G02B 5/08* (2006.01)
(52) U.S. Cl.
USPC ........................................... 359/861; 359/633
(58) Field of Classification Search
USPC ................... 359/630–633, 834, 833, 857, 861
See application file for complete search history.

(56) References Cited

U.S. PATENT DOCUMENTS

| | | | | |
|---|---|---|---|---|
| 4,711,512 A * | 12/1987 | Upatnieks | ........................... | 345/7 |
| 5,453,877 A * | 9/1995 | Gerbe et al. | ................... | 359/633 |
| 5,880,888 A * | 3/1999 | Schoenmakers et al. | ...... | 359/631 |
| 6,590,713 B2 * | 7/2003 | Okuyama | ...................... | 359/631 |
| 6,671,100 B1 * | 12/2003 | McRuer | ......................... | 359/630 |
| 6,690,516 B2 * | 2/2004 | Aritake et al. | ................. | 359/630 |
| 6,710,902 B2 * | 3/2004 | Takeyama | ........................ | 359/13 |
| 6,825,987 B2 | 11/2004 | Repetto et al. | | |
| 6,829,095 B2 | 12/2004 | Amitai | | |
| 6,903,876 B2 * | 6/2005 | Okada et al. | ................... | 359/633 |
| 6,919,976 B2 * | 7/2005 | Kasai et al. | ...................... | 359/13 |
| 7,477,453 B2 * | 1/2009 | Repetto et al. | ................. | 359/631 |
| 7,577,326 B2 * | 8/2009 | Amitai | .............................. | 385/36 |
| 7,656,585 B1 * | 2/2010 | Powell et al. | .................. | 359/630 |
| 7,778,508 B2 * | 8/2010 | Hirayama | ........................ | 385/36 |
| 8,059,342 B2 * | 11/2011 | Burke | ........................... | 359/630 |
| 8,433,172 B2 * | 4/2013 | Pascal et al. | ................... | 385/146 |
| 8,446,675 B1 * | 5/2013 | Wang et al. | .................... | 359/633 |
| 8,456,744 B2 * | 6/2013 | Dobschal et al. | ............. | 359/630 |
| 2002/0186179 A1 * | 12/2002 | Knowles | ........................... | 345/8 |
| 2007/0211227 A1 * | 9/2007 | Era | ................................. | 353/99 |

(Continued)

FOREIGN PATENT DOCUMENTS

| | | | |
|---|---|---|---|
| CN | 101382253 A | 3/2009 | |
| CN | 101655606 A | 2/2010 | |

(Continued)

*Primary Examiner* — Euncha Cherry
(74) *Attorney, Agent, or Firm* — Oliff PLC

(57) ABSTRACT

Since a distance from an image extraction part to a light exiting surface is shorter downstream in an optical path than upstream in the optical path in relation to Z direction that is an arraying direction of reflection units, image light that propagates to pass between the image extraction part and the light exiting surface without becoming incident on the reflection units and therefore cannot be extracted to outside can be reduced. That is, since image light having a large total reflection angle in a light guide plate can be securely made incident on the image extraction part and efficiently extracted from the light exiting surface, light use efficiency in image formation can be enhanced. Thus, a virtual image display apparatus with brightness and high performance can be provided.

21 Claims, 8 Drawing Sheets

(56) References Cited

U.S. PATENT DOCUMENTS

2010/0039796 A1    2/2010  Mukawa
2010/0260455 A1*  10/2010  Pascal et al. ............... 385/36
2011/0310491 A1*  12/2011  Takagi et al. ............... 359/633
2012/0243102 A1*   9/2012  Takeda et al. .............. 359/630
2013/0135749 A1*   5/2013  Akutsu et al. .............. 359/633

FOREIGN PATENT DOCUMENTS

DE    102009010537      *  8/2010  ............ G02B 27/01
JP    A-2003-536102        12/2003
JP    A-2004-157520         6/2004
WO    WO 2009074638 A2 *   6/2009  ............ G02B 27/01

* cited by examiner

LIGHT GUIDE PLATE AND VIRTUAL IMAGE DISPLAY APPARATUS HAVING THE SAME

BACKGROUND

1. Technical Field

The present invention relates to a light guide plate used for a head mounted display or the like that is mounted on a person's head for use, and a virtual image display apparatus incorporating the same.

2. Related Art

Recently, as virtual image display apparatuses that enable formation and observation of virtual images such as a head mounted display, various types are proposed in which a light guide plate guides an image light from a display element to the pupils of the observer's eyes. As a light guide plate for such virtual image display apparatuses, a technique is known in which an image light is guided by utilizing total reflection and the image light is also reflected by plural partial reflection surfaces arranged parallel to each other at a predetermined angled to a main surface of the light guide plate and is thus extracted from the light guide plate so that the image light reaches the retinas of the observer's eyes (see JP-T-2003-536102 and JP-A-2004-157520). The plural partial reflection surfaces provided on the light guide plate can be provided, for example, in the form of a reflection layer formed at a part with a sawtoothed cross section (see FIG. 5 of JP-A-2004-157520).

In the light guide plate having the reflection layer at the part with a sawtoothed cross as described above, a luminous flux having a certain total reflection angle or greater in the light guide plate may not become incident on the reflection layer and may pass through the reflection layer. Therefore, a luminous flux that is not used for image formation is generated and efficiency of use of light is lowered.

SUMMARY

An advantage of some aspects of the invention is that a light guide plate for a virtual image display apparatus with improved efficiency of use of light and a virtual image display apparatus incorporating the same are provided.

An aspect of the invention is directed to a light guide plate including: a light incident part which takes image light to inside; a light guide part which has first and second total reflection surfaces extending to face each other and guides the image light taken in from the light incident part by total reflection on the first and second total reflection surfaces; an image extraction part which includes plural reflection units arrayed in a predetermined arraying direction and having a first reflection surface and a second reflection surface forming a predetermined angle with the first reflection surface, and which enables extraction of the image light to outside by bending an optical path in the reflection units so that the image light guided by the light guide part is reflected by the first reflection surface and the image light reflected by the first reflection surface is further reflected by the second reflection surface; and a light exiting part having a light exiting surface which emits, to outside, the image light passed through the image extraction part. A space between the first and second reflection surfaces of the reflection units of the image extraction part and the light exiting surface is relatively broad on the light incident part side. Here, total reflection refers not only to a case where all light is reflected by inner surfaces and thus transmitted, but also to a case where light is reflected by a mirror coat or a half-mirror film or the like of a translucent aluminum film applied to a surface that satisfies total reflection conditions.

In the light guide plate, the distance from the first and second reflection surfaces of the reflection units constituting the image extraction part to the light exiting surface is relatively broad on the light incident part side in relation to the predetermined arraying direction. Therefore, the distance from the first and second reflection surfaces of the reflection units to the light exiting surface is relatively narrow on the reflected light incident part side and image light that is propagated to pass between the image extraction part and the light exiting surface without becoming incident on the reflection units constituting the image extraction part and therefore cannot be extracted to outside, can be reduced. That is, since more of image light having a large total reflection angle in the light guide plate can be made incident on the image extraction part and efficiently extracted from the light exiting part, light use efficiency in image formation can be improved.

In a specific aspect of the invention, the first and second reflection surfaces of at least one or more reflection units of the image extraction part are arranged at a position closer to the light exiting surface to reflect more of the image light toward the light exiting part, compared with the first and second reflection surfaces of other reflection units arranged more toward the light incident part side than the at least one or more reflection units. In other words, the passage width or light guide width of the optical path of the image light is relatively narrow on the side of the at least one or more reflection units arranged on the reflected light incident part side. In this case, image light having a large total reflection angle in the light guide plate can be bent toward the light exiting surface by the reflection unit arranged at the position closer to the light exiting surface on the reflected light incident part side, and the image light guided by the light guide plate can be efficiently gathered and used for image formation. By reducing the distance from the reflection units to the light exiting surface, an effect of concentrating the image light incident on the reflection unit on the reflected light incident part side, into the direction of the eyes, can be enhanced.

In one aspect of the invention, the first and second reflection surfaces of the reflection unit arranged most closely to a reflected light incident part side of the image extraction part are arranged at a position closer to the light exiting surface than are the first and second reflection surfaces of the reflection unit arranged most closely to the light incident part side of the image extraction part. In this case, image light having a total reflection angle in the light guide plate can be bent toward the light exiting surface and hence toward the eyes by the reflection unit arranged most closely to the reflected light incident part side. The image light guided by the light guide plate can be efficiently gathered and used for image formation.

In one aspect of the invention, in a partial zone on a reflected light incident part side in relation to the predetermined arraying direction, of the image extraction part, the first and second reflection surfaces of the reflection units are arranged at a position closer to the light exiting surface as these reflection surfaces are situated toward the reflected light incident part side. In this case, the image light can be securely made incident on the first and second reflection surfaces of each reflection unit constituting the image extraction part.

In one aspect of the invention, in a basic zone closer to the light incident part side than is the partial zone, of the image extraction part, the first and second reflection surfaces of the reflection unit are arranged to keep a constant space to the light exiting surface.

In one aspect of the invention, the first and second reflection surfaces of the reflection units in the partial zone are arranged along an inclined flat surface that is inclined by a predetermined angle in relation to a predetermined inclination direction from a state parallel to the first total reflection surface. In this case, image light incident on the reflection units arranged along the inclined flat surface is gathered toward the light exiting part in a relatively uniform state and used for image formation.

In one aspect of the invention, the first and second reflection surfaces of the reflection units in the partial zone are arranged along a curved surface that is inclined in relation to a predetermined inclination direction from a state parallel to the first total reflection surface and has a changing inclination angle. In this case, image light incident on the first and second reflection surfaces of the reflection units arranged along the curved surface is gathered toward the light exiting part in a less turbulent state and used for image formation.

In one aspect of the invention, the first and second reflection surfaces of the reflection units in the partial zone are arranged along a curved surface which has an inclination angle to the first total reflection surface increasing toward the reflected light incident part side in relation to the predetermined arraying direction. In this case, image light can be securely made incident on the first and second reflection surfaces of each reflection unit arranged along the curved surface.

In one aspect of the invention, the first and second reflection surfaces of at least one reflection unit on a reflected light incident part side, of the image extraction part, are arranged closely to the light exiting surface. In this case, the image light guided by the light guide plate can be effectively utilized.

In one aspect of the invention, the first and second reflection surfaces of at least one reflection unit on the light incident part side, of the image extraction part, are arranged closely to the first total reflection surface. In this case, the image light guided by the light guide plate can be effectively utilized.

In one aspect of the invention, in each reflection unit, the first reflection surface is situated more closely to the reflected light incident part side than is the second reflection surface, and extends in a direction substantially orthogonal to the first total reflection surface of the light guide part. In this case, incident light on each reflection unit can be reflected without waste and can be securely guided to the eyes situated ahead of the light exiting part.

Another aspect of the invention is directed to a virtual image display apparatus including: (a) the light guide plate of any of the aspects described above; and (b) an image forming device which forms the image light guided by the light guide plate. In this case, by using the light guide plate as described above, the virtual image display apparatus can emit virtual image light with high light use efficiency while preventing uneven luminance.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a light guide plate for a virtual image display apparatus and a virtual image display apparatus incorporating the light guide plate according to a first embodiment will be described.

A. Structure of Light Guide Plate and Virtual Image Display Apparatus

Figure 1A:
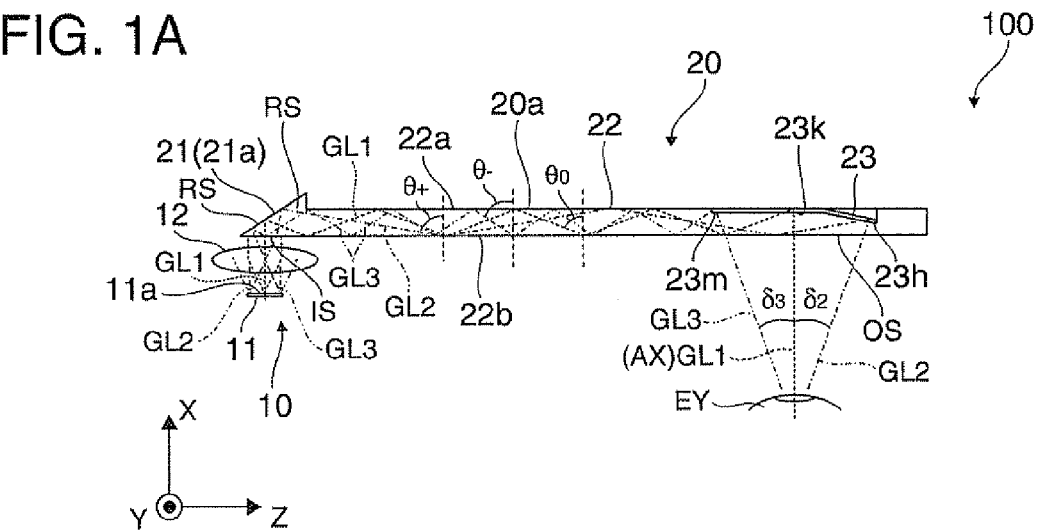
FIG. 1A is a sectional view showing a virtual image display apparatus according to a first embodiment.
Figure 1B:
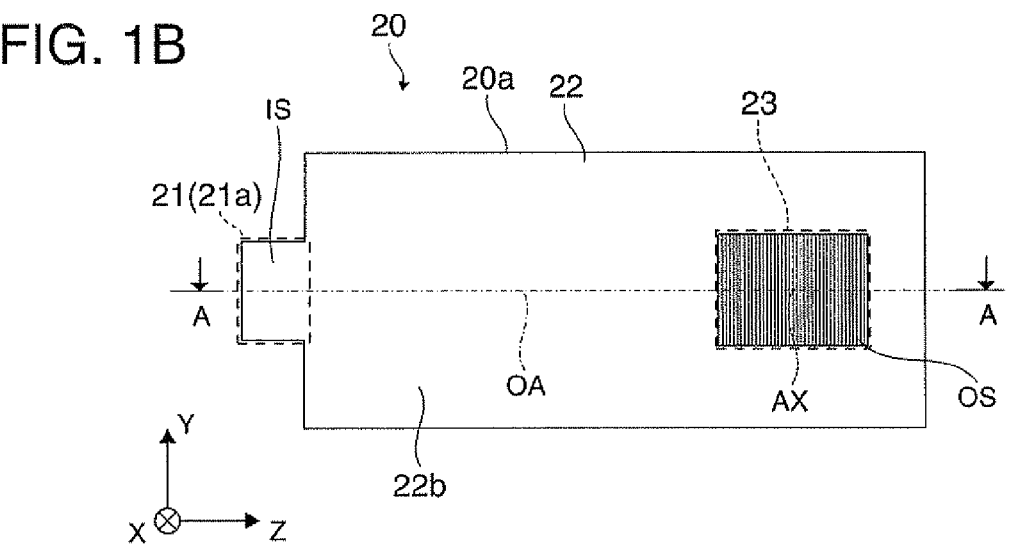
FIG. 1B and FIG. 1C are front and plan views of a light guide plate according to the embodiment.

A virtual image display apparatus 100 according to this embodiment shown in FIG. 1A is applied to a head mounted display and includes an image forming device 10 and a light guide plate 20 as a set. FIG. 1 corresponds to A-A section of the light guide plate 20 shown in FIG. 1B.

The virtual image display apparatus 100 allows an observer to recognize image light based on a virtual image and also allows the observer to observe an external image as a see-through view. A set of the image forming device 10 and the light guide plate 20 is provided corresponding to the right eye of the observer and another set is provided corresponding to the left eye. However, since the sets for the right eye and for the left eye are of left-right symmetry, only the set for the left eye is shown here and the set for the right eye is not shown. The virtual image display apparatus 100 as a whole has an appearance (not shown) of, for example, ordinary spectacles.

The image forming device 10 has a liquid crystal device 11 as an image display device and a collimating lens 12 for forming a luminous flux. The liquid crystal device 11 spatially modulates illuminating light from a light source (not shown) provided behind the liquid crystal device 11 and forms image light to be a display target such as a dynamic image. The collimating lens 12 forms the image light emitted from each point on the liquid crystal device 11 into a parallel luminous flux. The lens material of the collimating lens 12 can be any of glass or plastics.

Figure 1C:
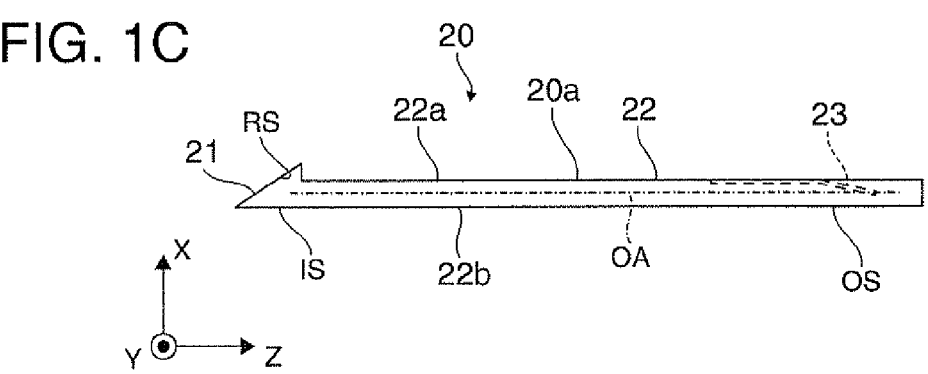

As shown in FIG. 1A to FIG. 1C, the light guide plate 20 according to the embodiment has a light guide plate body 20a, an incident light bending part 21, and an image extraction part 23. The light guide plate 20 emits the image light formed by the image forming device 10 toward the eye EY of the observer as virtual image light and thus allows the observer to recognize the virtual image light as an image.

The overall appearance of the light guide plate 20 is formed by the light guide plate body 20*a* which is a flat plate extending parallel to YZ plane in the drawings. The light guide plate 20 also has the image extraction part 23 including a number of micro mirrors incorporated in the light guide plate body 20*a* at one end in the longitudinal direction, and has the incident light bending part 21 attached to a prism part PS that is formed to extend the light guide plate body 20*a* at the other end in the longitudinal direction.

The light guide plate body 20*a* is made of a light-transmitting resin material or the like and has a light incident surface IS as a light incident part to take in the image light from the image forming device 10 and a light exiting surface OS as a light exiting part to emit the image light toward, the eye EY of the observer, on a face-side flat surface that is parallel to YX plane and faces the image forming device 10. The light guide plate body 20*a* has a rectangular slant surface RS in addition to the light incident surface IS, as a lateral surface of the prism part PS provided at one end of the light guide plate body 20*a*. On the slant surface RS, a mirror layer 21*a* is formed to cover the slant surface RS. Here, the mirror layer 21*a*, in cooperation with the slant surface RS, functions as the incident light bending part 21 as a reflection surface inclined with respect to the light incident surface IS. Moreover, on the back side of the light guide plate body 20*a*, the image extraction part 23 with a fine structure is formed along and facing the light exiting surface OS.

The incident light bending part 21 as the mirror layer 21*a* arranged in the inclined state facing the light incident surface IS of the light guide plate body 20*a* is formed by deposition such as aluminum evaporation on the slant surface RS of the light guide plate body 20*a*, and functions as a reflection surface to reflect incident light and bend its optical path in a predetermined direction close to a substantially orthogonal direction. That is, the incident light bending part 21 bends and directs the image light that becomes incident from the light incident surface IS and directed in +X direction as a whole, into +Z direction slightly lopsided toward the −X direction as a whole, and thus securely combines the image light within the light guide plate body 20*a*.

The light guide plate body 20*a* also has a light guide part 22 to guide the image light incident inside via the incident light bending part 21 towards the image extraction part 23, across a portion from the incident light bending part 21 on the entry side (that is, the light incident part side) to the image extraction part 23 on the rear side (that is, the reflected light incident part side).

The light guide part 22 has a first total reflection surface 22*a* and a second total reflection surface 22*b* each of which totally reflects the image light bent by the incident light bending part 21, as two flat surfaces that are equivalent to main surfaces of the flat plate-like light guide plate body 20*a*, face each other and extend parallel to YZ plane. Here, the first total reflection surface 22*a* is assumed to be on the back side farther from the image forming device 10, and the second total reflection surface 22*b* is assumed to be on the face side closer to the image forming device 10. In this case, the second total reflection surface 22*b* is a surface part that is common to the light incident surface IS and the light exiting surface OS. The image light reflected by the incident light bending part 21 first becomes incident on the second total reflection surface 22*b* and is totally reflected. Next, the image light becomes incident on the first total reflection surface 22*a* and is totally reflected. Then, as this operation is repeated, the image light is guided toward the reflected light incident part side of the light guide plate 20, that is, toward the +Z side where the image extraction part 23 is provided. Here, the transparent resin material used for the light guide plate body 20*a* is a high-refractive index material having a refractive index n of 1.5 or higher, for example. As the transparent resin material with a relatively high refractive index is used for the light guide plate 20, the image light can easily be guided inside the light guide plate 20 and the angle of view of the image light inside the light guide plate 20 can be made relatively small.

The image extraction part 23 arranged facing the light exiting surface OS of the light guide plate body 20*a* spreads two-dimensionally substantially along YZ plane. However, the distance from the image extraction part 23 to the light exiting surface OS is not uniform and is shorter on the reflected light incident part side than on the light incident part side, as will be described in detail later. The image extraction part 23 reflects, by a predetermined angle, the image light incident via the first and second total reflection surfaces 22*a* and 22*b* of the light guide part 22, and bends the image light toward the light exiting surface OS. Here, the first image light to be incident is assumed to be an extraction target as virtual image light. That is, the image light guided by the light guide plate body 20*a* becomes incident on the image extraction part 23 only once and thereby becomes bent in an appropriate direction and passes through the light exiting surface OS.

Figure 2:
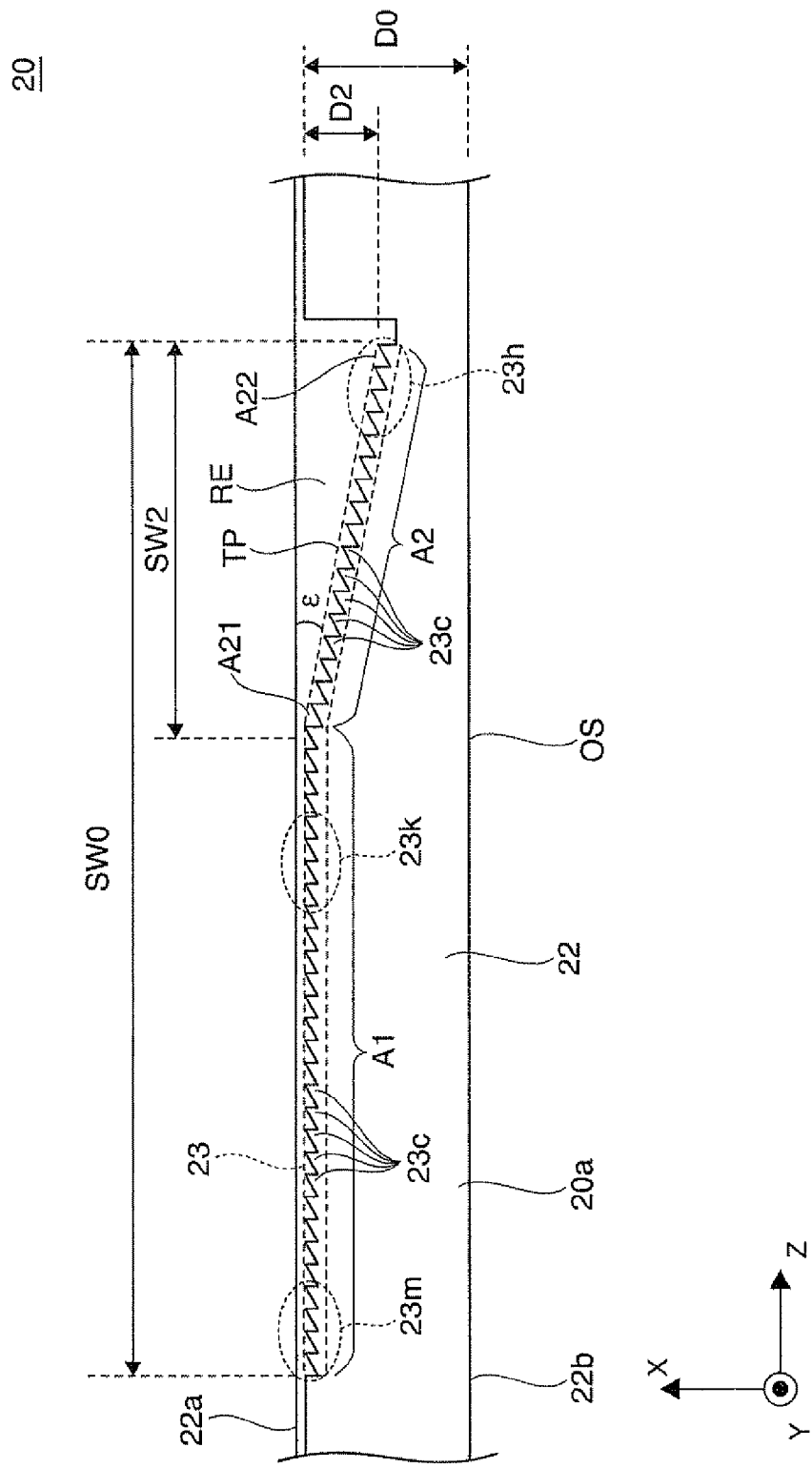
FIG. 2 is a sectional view illustrating the arrangement of an image extraction part in the light guide plate.

As shown in FIG. 2, the image extraction part 23 includes a number of thin linear reflection units 23*c* arranged in a striped shape. More specifically, the image extraction part 23 includes a number of elongated reflection units 23*c* extending in Y direction and arrayed cyclically at a predetermined pitch in an extending direction of the light guide part 22, that is, substantially along Z direction. That is, Z direction is the arraying direction of the reflection units 23*c*.

The image extraction part 23 is not completely uniform and is divided into a basic zone A1 arranged on the light incident part side and a partial zone A2 arranged on the reflected light incident part side. The basic zone A1 is a flat layered part and extends close and parallel to an extending plane of the first total reflection surface 22*a*. The partial zone A2 is a flat layered part and extends along an inclined flat surface TP inclined so that the partial zone A2 is away from the extending surface of the first total reflection surface 22*a* on the reflected light incident part side. That is, in the basic zone A1, the distance from each reflection unit 23*c* constituting the image extraction part 23 to the light exiting surface OS is kept constant irrespective of position in Z direction in which the optical axis OA extends. Meanwhile, in the partial zone A2, the distance from each reflection unit 23*c* constituting the image extraction parts 23 to the light exiting surface OS is gradually decreased from the light incident part side, that is, from an end 21A on the −Z side, toward the reflected light incident part side, that is, toward an end A22 on the +Z side. Consequently, the reflection unit 23*c* arranged at the end closest to the reflected light incident part side, of the image extraction part 23, is arranged at a position closer to the light exiting surface OS than is the reflection unit 23*c* arranged at the end closest to the light incident part side. As viewed from a different perspective, the space between the reflection unit 23*c* arranged at the end closest to the reflected light incident part side and the light exiting surface OS is relatively narrow. The space between the reflection unit 23*c* arranged at the end closest to the light incident part side and the light exiting surface OS is relatively broad. Here, the most downstream and most upstream reflection units 23*c* in the optical path, of the image extraction part 23, are considered in terms of the effective zone of the image extraction part 23. That is, the reflection unit 23c provided several units toward the −Z side from the reflection unit 23c that is the closest to the +Z side of the image extraction part 23 may be the reflection unit that is the closest to the reflected light incident part side within the effective zone. As described above, in the case where the partial zone A2 is provided and the reflection unit 23c arranged at the end closest to the reflected light incident part side is arranged at a position relatively close to the light exiting surface OS, as will be described in detail later, luminous fluxes that are not bent by the image extraction part 23 and leak out toward the reflected light incident part side out of a peripheral part 23h of the image extraction part 23 can be reduced.

A width SW2 of the partial zone A2 in Z direction is half or less than a full width SW0 of the image extraction part 23 in Z direction in the illustrated example, but can be equal to the full width SW0 or a value close to the full width SW0. In this case, the basic zone A1 practically does not exist. If the inclination angle in relation to Z direction, of the inclined flat surface TP where the partial zone A2 is arranged, is $\epsilon$, a depth D2 of the partial zone A2 is expressed by D2=SW2×tan $\epsilon$. If the thickness of the light guide plate body 20a in X direction is D0, the relation of SW2×tan $\epsilon$<D0 holds.

B. Optical Path of Image Light

Hereinafter, the optical path of the image light will be described in detail. As shown in FIG. 1A, of image light exiting the top of an exit surface 11a of the liquid crystal device 11, a component exiting a center part of the exit surface 11a indicated by a dotted line in FIG. 1A is an image light GL1. A component exiting the left side (−Z side) on the sheet, of the periphery of the exit surface 11a, indicated by a chain dotted line in FIG. 1A, is an image light GL2. A component exiting the right side (+Z side) on the sheet, of the periphery of the exit surface 11a, indicated by a double chain dotted line in FIG. 1A, is an image light GL3.

Each of principal components of the image lights GL1, GL2 and GL3 passed through the collimating lens 12 becomes incident on the light incident surface IS of the light guide plate 20 and then repeats total reflection at different angles from each other on the first and second total reflection surfaces 22a and 22b. Specifically, of the image lights GL1, GL2 and GL3, the image light GL1 exiting the center part of the exit surface 11a of the liquid crystal device 11 is reflected by the incident light bending part 21 as a parallel luminous flux, then becomes incident at a standard reflection angle $\theta_0$ on the second total reflection surface 22b of the light guide part 22, and is totally reflected. After that, the image light GL1 repeats total reflection on the first and second total reflection surfaces 22a and 22b, keeping the standard reflection angle $\theta_0$. The image light GL1 is totally reflected N times (N being a natural number) by the first and second total reflection surfaces 22a and 22b and becomes incident on a center part 23k of the image extraction part 23. The image light GL1 is reflected at a predetermined angle in this center part 23k and exits the light exiting surface OS as a parallel luminous flux in the direction of the optical axis AX perpendicular to YZ plane including the light exiting surface OS. The image light GL2 exiting the one end side (−Z side) of the exit surface 11a of the liquid crystal device 11 is reflected by the incident light bending part 21 as a parallel luminous flux, then becomes incident at a maximum reflection angle $\theta_+$ on the second total reflection surface 22b of the light guide part 22, and is totally reflected. The image light GL2 is totally reflected, for example, N-M times (M being a natural number) by the first and second total reflection surfaces 22a and 22b, then is reflected at a predetermined angle in a peripheral part 23m closest to the reflected light incident part side (+Z side) of the image extraction part 23, and exits the light exiting surface OS as a parallel luminous flux into the direction of a predetermined angle. The exit direction in this case is to return to the incident light bending part 21 side and has an obtuse angle to +Z axis. The image light GL3 exiting the other end side (+Z side) of the exit surface 11a of the liquid crystal device 11 is reflected by the incident light bending part 21 as a parallel luminous flux, then becomes incident at a minimum reflection angle $\theta_−$ on the second total reflection surface 22b of the light guide part 22, and is totally reflected. The image light GL3 is totally reflected, for example, N+M times by the first and second total reflection surfaces 22a and 22b, then is reflected at a predetermined angle in the peripheral part 23h that is the closest to the light incident part side (−Z side) of the image extraction part 23, and exits the light exiting surface OS as a parallel luminous flux into the direction of a predetermined angle. The exit direction in this case is to move away from the incident light bending part 21 side and has an acute angle to +Z axis.

Since the reflection efficiency of light in total reflection by the first and second total reflection surfaces 22a and 22b is very high, difference in the number of times of reflection among the image lights GL1, GL2 and GL3, if any, causes little reduction in luminance. Moreover, while the image lights GL1, GL2 and GL3 as described as representing part of the entire luminous fluxes of the image light, other luminous flux components constituting the image light are guided and exit the light exiting surface OS similarly to the image light GL1 and the like and therefore are not described or shown.

C. Structure of Image Extraction Part and Bending of Optical Path by Image Extraction Part Hereinafter, bending of the optical path of the image light by the image extraction part 23 will be described in detail with reference to FIG. 3A and the like.

The image extraction part 23 includes a number of elongated reflection units 23c extending in Y direction and arrayed cyclically in Z direction at a predetermined pitch PT, in both the basic zone A1 on the light incident part side and the partial zone A2 on the reflected light incident part side. Each reflection unit 23c has a first reflection surface 23a arranged on the rear side, that is, on the reflected light incident part side, and a second reflection surface 23b arranged on the entry side, that is, the light incident part side. Here, at least the second reflection surface 23b is a partial reflection surface capable of transmitting a part of light and enables the observer to observe an external image as a see-through view. Each reflection unit 23c is V-shaped or wedged as viewed on the XZ cross section, by the neighboring first and second reflection surfaces 23a and 23b. More specifically, the first and second reflection surfaces 23a and 23b form an acute angle to each other, and similarly to the whole of the reflection unit 23c, extend in an elongated linear shape with their longitudinal directions being Y direction extending perpendicularly to Z direction parallel to the first total reflection surface 22a and along the overall optical path.

A specific numerical range of the pitch PT of the reflection units 23c is 0.2 mm or greater, more preferably 0.5 mm to 1.3 mm. As the pitch PT is within this range, the image light to be extracted is not affected by diffraction in the image extraction part 23 and the checkered pattern of the reflection units 23c can be less conspicuous to the observer.

Hereinafter, the inclination of the first reflection surface 23a and the second reflection surface 23b constituting the reflection unit 23c will be described in detail.

First, in the basic zone A1 on the light incident part side, the first reflection surface 23a constituting each reflection unit 23c extends along a direction (X direction) substantially perpendicular to the first total reflection surface 22a. In the same reflection unit 23c, the second reflection surface 23b next to the first reflection surface 23a extends in a direction that forms a predetermined angle (relative angle) α to the first reflection surface 23a. Here, the relative angle α is set in consideration of the extraction efficiency of the image light by the reflection unit 23c. In this specific example, the relative angle α is assumed to be, for example, 54.7°.

Also in the partial zone A2 on the reflected light incident part side, the first reflection surface 23a constituting each reflection unit 23c extends along a direction (X direction) substantially perpendicular to the first total reflection surface 22a. In the same reflection unit 23c, the second reflection surface 23b next to the first reflection surface 23a extends in a direction that forms the relative angle α (specifically, for example, 54.7°) to the first reflection surface 23a, as in the reflection unit 23c in the basic zone A1.

Here, in the partial zone A2, the reflection unit 23c is arranged to be inclined away from the first total reflection surface 22a on the reflected light incident part side. Therefore, the distance from the reflection surfaces 23a and 23b of the reflection unit 23c to the first total reflection surface 22a gradually increases according to position in +Z direction. Thus, in the case of the reflection unit 23c in the partial zone A2, a length d2 of the first reflection surface 23a is longer than a length d1 of the first reflection surface 23a constituting the reflection unit 23c in the basic zone A1 by an amount which compensates for the step. That is, in the partial zone A2, the area of the first reflection surface 23a is relatively broad.

Hereinafter, bending of the optical path of the image light by the image extraction part 23 will be described in detail. Here, the image light GL2 and the image light GL3 incident on both ends of the image extraction part 23 are shown. Other optical paths are similar to these image lights and therefore are not shown or described further.

Figure 3A:
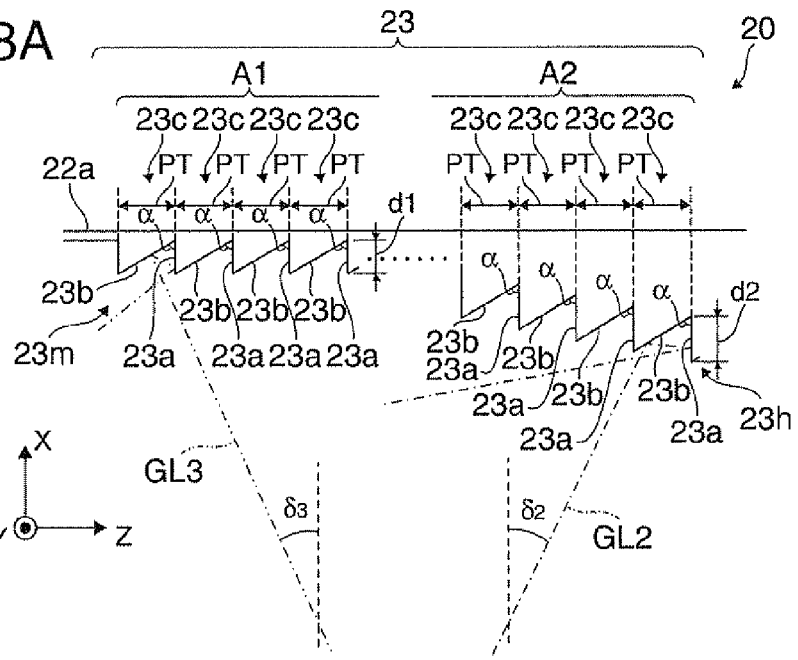
FIG. 3A to FIG. 3C are schematic views for explaining the optical path of image light in the image extraction part.
Figure 3B:
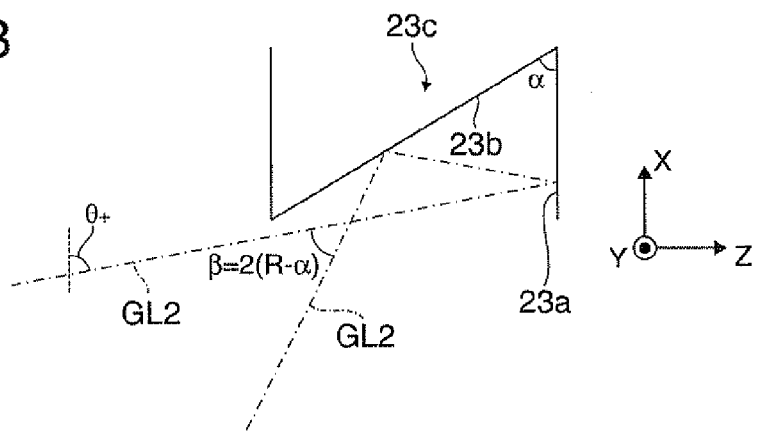

First, as shown in FIG. 3A, and FIG. 3B, which is a partial enlarged view thereof, the image light GL2 guided at the largest reflection angle $\theta_+$ of all the total reflection angles of the image light becomes incident on the one reflection unit 23c arranged in the peripheral part 23h on the reflected light incident part side, that is, on the +Z side, which is the farthest from the light incident surface IS (see FIG. 1A) of the image extraction part 23. In the reflection unit 23c shown in FIG. 3B, the image light GL2 is first reflected by the first reflection surface 23a on the reflected light incident part side, that is, on the +Z side, and is then reflected by the second reflection surface 23b on the light incident part side, that is, on the −Z side. The image light GL2 passed through this reflection unit 23c exits the light exiting surface OS shown in FIG. 1A and the like, without going through the other reflection units 23c. That is, the image light GL2 is bent at a desired angle by passing through the image extraction part 23 only once and is extracted toward the observer.

Figure 3C:
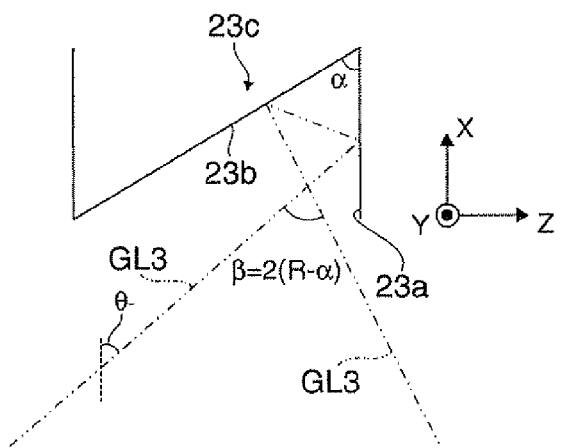

Moreover, as shown in FIG. 3A, and FIG. 3C, which is a partial enlarged view thereof, the image light GL3 guided at the smallest reflection angle $\theta_-$ of all the total reflection angles becomes incident on the one reflection unit 23c arranged in the peripheral part 23m on the light incident part side, that is, on the −Z side, which is the closest to the light incident surface IS (see FIG. 1A) of the image extraction part 23. In the reflection unit 23c shown in FIG. 3C, the image light GL3 is first reflected by the first reflection surface 23a on the reflected light incident part side, that is, on the +Z side, and is then reflected by the second reflection surface 23b on the light incident part side, that is, on the −Z side, as in the case of the image light GL2 of FIG. 3B. The image light GL3 passed through this reflection unit 23c is bent at a desired angle by passing through the image extraction part 23 only once, without going through the other reflection units 23c, and is extracted toward the observer.

Here, in the case of the two-stage reflection by the first and second reflection surfaces 23a and 23b as described above, a bending angle β that is the angle formed by the direction of each image light at the time of becoming incident and the direction at the time of exiting is $\beta=2(R-\alpha)$ (R being a right angle) for both image lights, as shown in FIG. 3B and FIG. 3C. That is, the bending angle β is constant irrespective of the value of the reflection angles $\theta_0$, $\theta_+$, and $\theta_-$ or the like, which are the incident angles on the image extraction part 23, that is, the total reflection angles of each image light. Thus, even when a component having a relatively large total reflection angle of the image light is made incident on the peripheral part 23h side on the +Z side of the image extraction part 23 and a component having a relatively small total reflection angle is made incident on the peripheral part 23m side on the −Z side of the image extraction part 23, as described above, the image light can be efficiently extracted with an angle such that the image light as a whole is gathered to the eye EY of the observer. Since the image light is extracted in such an angular relation, the light guide plate 20 can pass the image light through the image extraction part 23 only once instead of plural times and thus enables extraction of the image light as virtual image light with little loss.

By properly adjusting the angles at which the image lights GL2, GL3 and the like are guided in optical designs such as the shape and the refractive index of the light guide part 22 and the shape of the reflection units 23c constituting the image extraction part 23, the image light exiting the light exiting surface OS can be made incident on the eye EY of the observer as virtual image light maintaining its overall symmetry about the basic image light GL1, that is, the optical axis AX. That is, an angle $\delta_2$ of the image light GL2 at the one end to X direction or to the optical axis AX and an angle $\delta_3$ of the image light GL3 at the other end to X direction or to the optical axis AX have substantially the same size and are in the opposite directions. The angles $\delta_2$ and $\delta_3$ of the image lights GL2 and GL3 are relatively close to perpendicular to the light exiting surface OS or the second total reflection surface 22b, and these image lights pass through the light exiting surface OS with a sufficient transmittance. The angles $\delta_2$ and $\delta_3$ are equivalent to the angle of view of the virtual image formed by the image light emitted from the image forming device 10, though, strictly, refraction at the time of passing through the light exiting surface OS or the second total reflection surface 22b needs to be considered.

Now, the detailed arrangement of the reflection units 23c will be described with reference to FIG. 3A. In the basic zone A1 on the left side in FIG. 3A, that is, on the light incident part side, the reflection surfaces 23a and 23b of the reflection units 23c are arranged near the first total reflection surface 22a and consequently the farthest from the light exiting surface OS shown in FIG. 2. Meanwhile, in the partial zone A2 on the right side in FIG. 3A, that is, on the reflected light incident part side, the reflection surfaces 23a and 23b of the reflection units 23c are arranged gradually away from the first total reflection surface 22a and consequently gradually approach the light exiting surface OS shown in FIG. 2 on the reflected light incident part side. In this specification, the space between the reflection surfaces 23a and 23b of the reflection units 23c and the first total reflection surface 22a is considered in terms of X direction, based on the positions on the optical path where the image lights GL2 and GL3 become incident on each reflection surface 23a and 23b, as a reference position. That is, the position in terms of X direction at a part close to the opening side of the reflection unit 23c with a wedged cross section serves as a reference. If the positions in X direction where the image lights GL2 and GL3 become incident on the two reflection surfaces 23a and 23b are different, the space is considered in terms of the average value of the two. Similarly, the space between the reflection surfaces 23a and 23b of the reflection units 23c and the light exiting surface OS (see FIG. 2) is considered in terms of X direction, based on the positions on the optical path where the image lights GL2 and GL3 become incident on each reflection surface 23a and 23b, as a reference position.

Figure 4A:
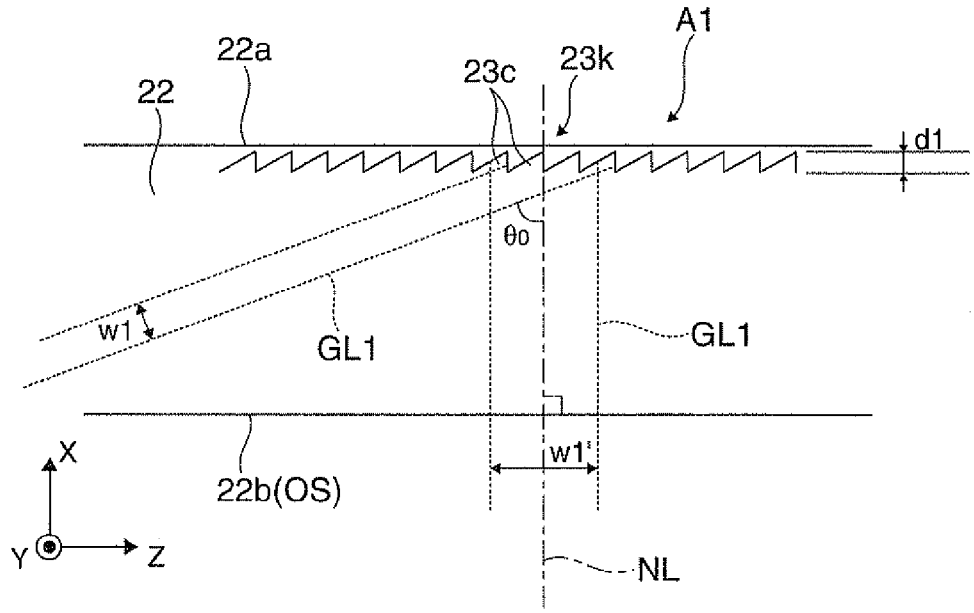
FIG. 4A and FIG. 4B show comparison of light use efficiency in a basic zone and a partial zone provided in the image extraction part.

As shown in FIG. 4A, the luminous flux incident on the center part 23k of the image extraction part 23, that is, the image light GL1, becomes incident on specific plural reflection units 23c provided in the basic zone A1, has its optical path bent by these reflection units 23c, and passes through the light exiting surface OS in a state substantially parallel to a normal line NL to the two total reflection surfaces 22a and 22b. At this point, the image light GL1 having a luminous flux width w1 exits with a luminous flux width w1' by the reflection in the image extraction part 23. In this case, the space between the reflection surfaces 23a and 23b of the reflection units 23c and the light exiting surface OS is relatively broad. That is, the passage width in relation to X direction (light guide width in X direction) of the optical path of the image light GL1 after the reflection is close to a thickness D0 of the light guide plate body 20a and is relatively broad.

Figure 4B:
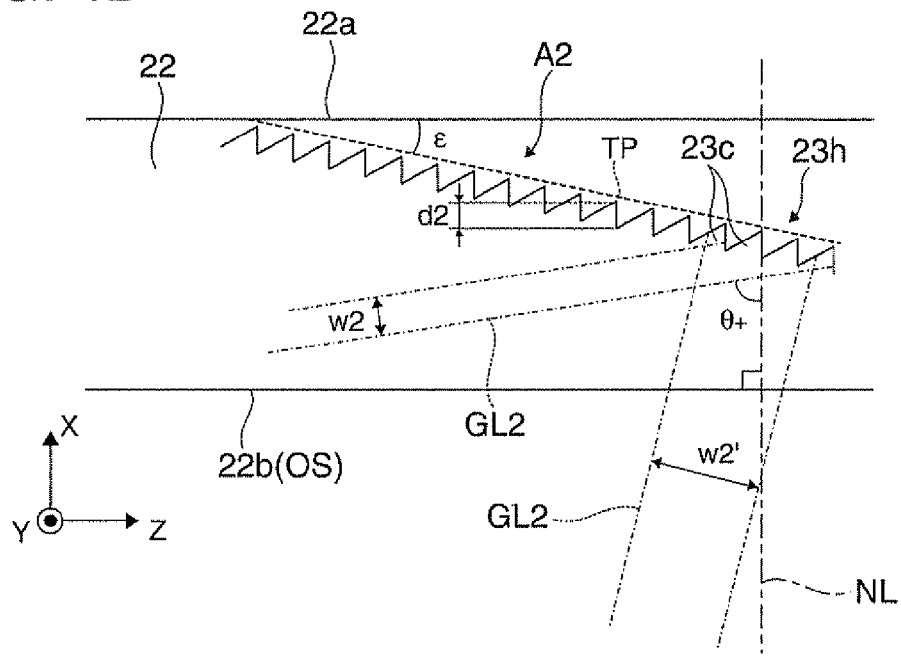

Meanwhile, as shown in FIG. 4B, the luminous flux incident on the peripheral part 23h on the +Z side of the image extraction part 23, that is, the image light GL2, becomes incident on specific plural reflection units 23c provided in the partial zone A2, has its optical path bent by these reflection units 23c, and passes through the light exiting surface OS in a state inclined in relation to the normal line NL to the two total reflection surfaces 22a and 22b. At this point, the image light GL2 having a luminous flux width w2 exits with a luminous flux width w2' by the reflection in the image extraction part 23. In this case, the space between the reflection surfaces 23a and 23b of the reflection units 23c and the light exiting surface OS is relatively narrow and gradually becomes narrower toward the reflected light incident part side. That is, the passage width in relation to X direction (light guide width in X direction) of the optical path of the image light GL2 after the reflection gradually becomes narrower on the reflected light incident part side, compared with the thickness D0 of the light guide plate body 20a.

In the above description, the basic zone A1, where the reflection units 23c of the center part 23k exist, extends near and parallel to an extending plane of the first total reflection surface 22a, and the partial zone A2, where the reflection units 23c of the peripheral part 23h exist, extends in an inclined manner to be away from the extending plane of the first total reflection surface 22a on the reflected light incident part side. That is, the partial zone A2 is rotated clockwise by an inclination angle $\epsilon$ from the parallel state to the first total reflection surface 22a, using Y direction, which is perpendicular to both the direction (X direction) of the normal line (NL) to the first total reflection surface 22a and the arraying direction (Z direction) of the reflection units 23c, as the direction of rotation axis. Consequently, an incident angle $\theta_+ - \epsilon$ at which the image light GL2 propagating with the relatively large total reflection angle $\theta_+$ becomes incident on the partial zone A2 is close to an incident angle $\theta_0$ at which the image light GL1 propagating with the relatively small total reflection angle $\theta_0$ becomes incident on the basic zone A1. The luminous flux width w2 on the incident side of the image light GL2 is close to the luminous flux width w1 on the incident side of the image light GL1. Thus, the luminous flux width w2' on the exit side of the image light GL2, too, is broad enough to be comparable to the luminous flux width w1' on the exit side of the image light GL1. Thus, the image is observed with high luminance. If the partial zone A2 is not inclined and is on the same plane with the basic zone A1, the luminous flux width w2 of the image light GL2 is significantly narrower than the luminous flux width w1 of the image light GL1. Therefore, the luminous flux width w2' on the exit side of the image light GL2, too, is significantly narrower than the luminous flux width w1' on the exit side of the image light GL1. Thus, the image is observed with low luminance, causing occurrence of uneven luminance.

By providing the partial zone A2 inclined to be away from the extending plane of the first total reflection surface 22a on the reflected light incident part side, image light having a large total reflection angle represented by the image light GL2 propagating through the light guide part 22 can be made incident and gathered on the light exiting surface OS side as a broad luminous flux, and the effect of gathering the image light to the observer's eye EY can be enhanced. Thus, the image light having a large total reflection angle, that is, the luminous flux that is reflected by a portion of the image extraction part 23 on the reflected light incident part side and becomes incident on the observer's eye EY via the light exiting surface OS can be provided with sufficient luminance, and the luminance of the virtual image formed by the virtual image display apparatus 100 can be provided with high uniformity in terms of position. As viewed from a different perspective, by providing the partial zone A2 inclined to approach the light exiting surface OS on the reflected light incident part side, image light that passes between the image extraction part 23 and the light exiting surface OS and is not utilized for virtual image formation can be reduced. That is, optical loss, such that light is guided into the light guide plate body 20a but propagates to the reflected light incident part side of the image extraction part 23 and ends up not being used instead of being extracted to the light exiting surface OS side by the image extraction part 23, can be reduced. Therefore, light use efficiency particularly in the portion on the reflected light incident part side of the image extraction part 23 can be increased and the uniformity of luminance of the virtual image formed by the virtual image display apparatus 100 can be improved.

Figure 5A:
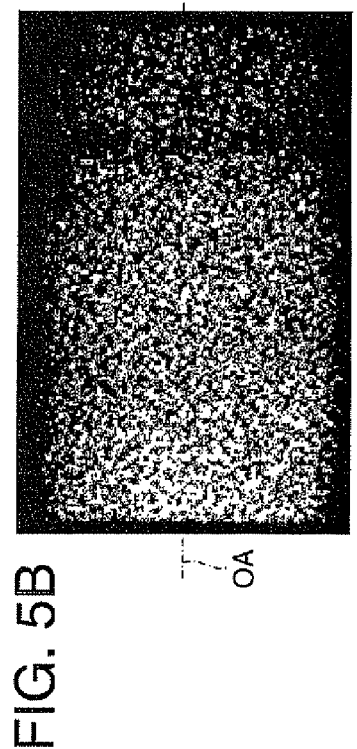
FIG. 5A and FIG. 5C illustrate two-dimensional luminance distribution and sectional luminance distribution of an image formed by the virtual image display apparatus of the first embodiment.

FIG. 5A illustrates two-dimensional luminance distribution of virtual image-type image light formed by the virtual image display apparatus 100 of the embodiment. FIG. 5B illustrates two-dimensional luminance distribution of virtual image-type image light formed by a virtual image display apparatus according of a comparative example. As is clear from the comparison between FIG. 5A and FIG. 5B, with the virtual image display apparatus 100 of the embodiment, occurrence of uneven luminance is significantly reduced. The virtual image display apparatus of the comparative example has a similar structure to the virtual image display apparatus 100 of the embodiment, but is different in that the image extraction part 23 as a whole extends closely to and parallel to the first total reflection surface 22a.

Figure 5C:
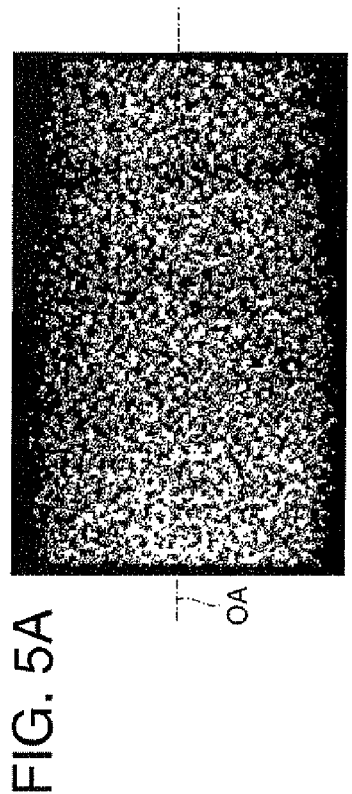
Figure 5B:
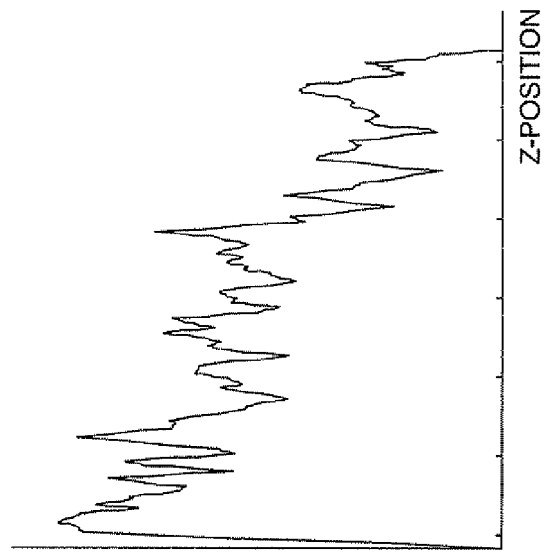
FIG. 5B and FIG. 5D illustrate two-dimensional luminance distribution and sectional luminance distribution of an image formed by a virtual image display apparatus as a comparative example.
Figure 5D:
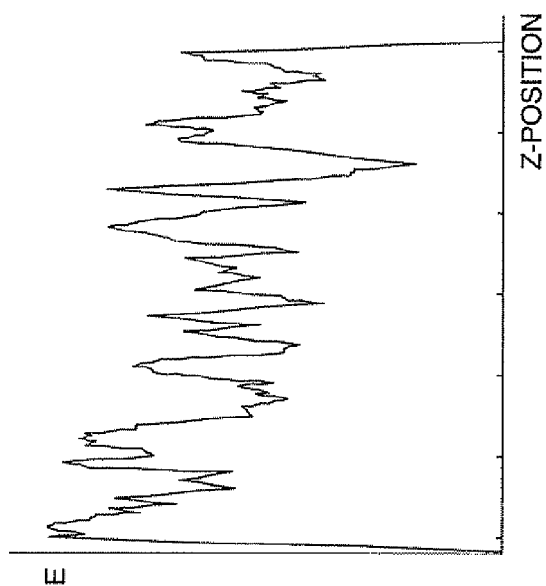

FIG. 5C is a graph showing luminance distribution in Z direction along the optical axis OA of the image light formed by the virtual image display apparatus 100 of the embodiment. FIG. 5D is a graph showing luminance distribution in Z direction along the optical axis OA of the image light formed by the virtual image display apparatus of the comparative example. As is clear from the comparison between the two graphs, with the virtual image display apparatus 100 of the embodiment, luminance distribution in Z direction is relatively uniform.

D. Method for Producing Light Guide Plate

Now, a method for producing essential parts of the light guide plate 20 will be briefly described with reference to FIG. 2. First, a base material part to be the foundations of the light guide part 22 and the image extraction part 23 is integrally formed using a light-transmitting resin material. On the base material part, a sawtoothed surface corresponding to the shape of the first and second reflection surfaces 23a and 23b is formed. Next, on the sawtoothed surface of the base material part, a reflection film to form the first and second reflection surfaces 23a and 23b is formed by aluminum evaporation. After that, an ultraviolet curing resin is applied from above to bury and flatten a recessed part RE, and ultraviolet rays are cast on the ultraviolet curing resin, thus curing this resin. In this manner, the light guide plate 20 with the image extraction part 23 embedded therein is produced.

E. Modifications of Light Guide Plate

Figure 6A:
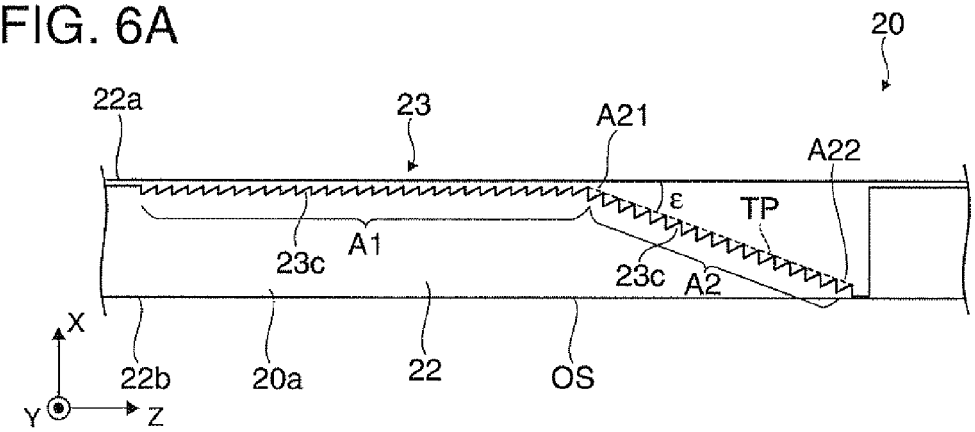
FIG. 6A to FIG. 6C are sectional views illustrating modifications of the light guide plate.

FIG. 6A illustrates the light guide plate 20 according to a first modification and is equivalent to FIG. 2. In this case, the reflection unit 23c provided most closely to the light incident part side in the partial zone A2, that is, its reflection surfaces 23a and 23b are formed closely to the first total reflection surface 22a. The reflection unit 23c provided most closely to the reflected light incident part side in the partial zone A2, that is, its reflection surfaces 23a and 23b are formed closely to the second total reflection surface 22b. That is, the inclined flat surface TP where the partial zone A2 is arranged has the largest inclination angle ϵ.

Figure 6B:
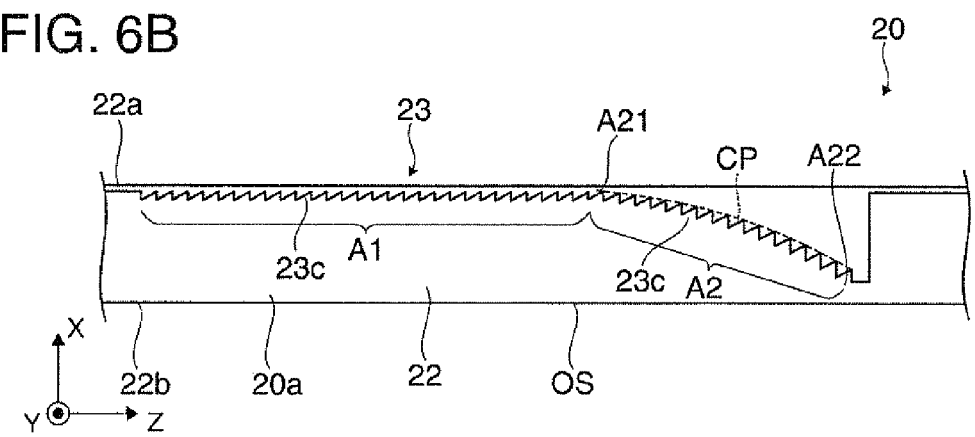

FIG. 6B illustrates the light guide plate 20 according to a second modification. In this case, the partial zone A2 extends along a curved surface CP where the inclination angle in relation to the extending plane of the first total reflection surface 22a increases on the reflected light incident part side. That is, in the partial zone A2 illustrated in FIG. 6B, the distance from each reflection unit 23c constituting the image extraction part 23, that is, its reflection surfaces 23a and 23b to the light exiting surface OS gradually increases from an end part A21 on the light incident part side, that is, on the −Z side, toward an end part A22 on the reflected light incident part side, that is, on the +Z side. The degree of increase is greater on the reflected light incident part side. In this case, end part A21 on the light incident part side of the partial zone A2 is smoothly connected to the end part on the reflected light incident part side of the basic zone A1. With such a light guide plate 20, too, luminous fluxes that lead out toward the reflected light incident part side without being bent by the image extraction part 23 can be reduced.

Figure 6C:
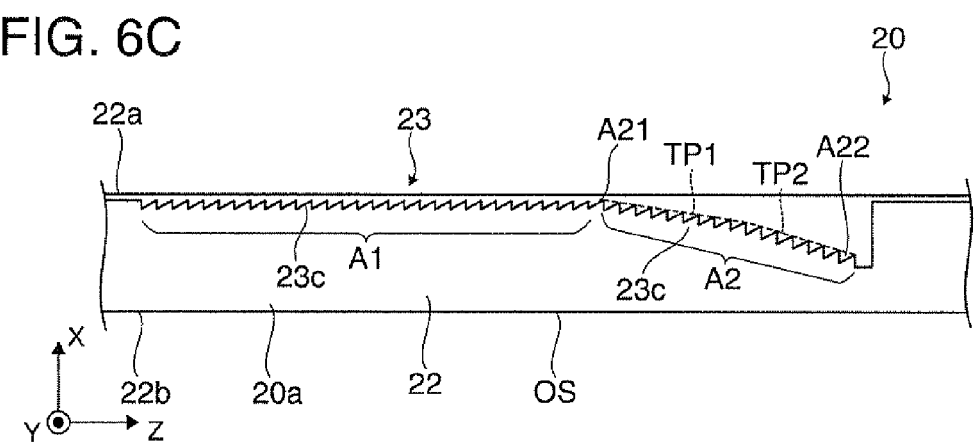

FIG. 6C illustrates the light guide plate 20 according to a third modification. In this case, the partial zone A2 extends along two inclined flat surfaces TP1 and TP2 having different inclination angles in relation to the extending plane of the first total reflection surface 22a. In the partial zone A2 illustrated in FIG. 6C, too, the distance from each reflection unit 23c constituting the image extraction part 23, that is, its reflection surfaces 23a and 23b to the light exiting surface OS gradually increases from the end part A21 on the light incident part side, that is, on the −Z side, toward the end part A22 on the reflected light incident part side, that is, on the +Z side. Again, with such a light guide plate 20, luminous fluxes that lead out toward the reflected light incident part side without being bent by the image extraction part 23 can be reduced. The partial zone A2 can also be made to extend bending along three or more inclined flat surfaces, instead of the two inclined flat surfaces TP1 and TP2.

In the light guide plate 20 of the embodiment as described above, the space between the reflection surfaces 23a and 23b of the reflection units 23c constituting the image extraction part 23 and the light exiting surface OS is relatively narrower on the reflected light incident part side than on the light incident part side in relation to Z direction, which is the arraying direction of the reflection units 23c. Therefore, image light that does not become incident on the reflection units 23c but propagates to pass between the image extraction part 23 and the light exiting surface OS and therefore cannot be extracted outside can be reduced. That is, since image light having a large total reflection angle in the light guide plate 20 can be securely made incident on the image extraction part 23 and can be efficiently extracted from the light exiting surface OS, light use efficiency in image formation can be enhanced. Thus, the virtual image display apparatus 100 with brightness and high performance can be provided.

Second Embodiment

Hereinafter, a second embodiment that is a modification of the first embodiment will be described with reference to FIG. 7 and the like. A light guide plate according to this embodiment has a similar structure to the light guide plate 20 shown in FIG. 2 and the like, except for the structure of the image extraction part. Therefore, FIG. 7 only shows the image extraction part and its periphery. The structure of the light guide plate and the overall structure of the virtual image display apparatus will not be shown or described further. In the second embodiment shown in FIG. 7, the same reference numerals as in the light guide plate 20 of FIG. 2 and the like denote equivalents to the components described in the first embodiment unless otherwise specified.

Figure 7:
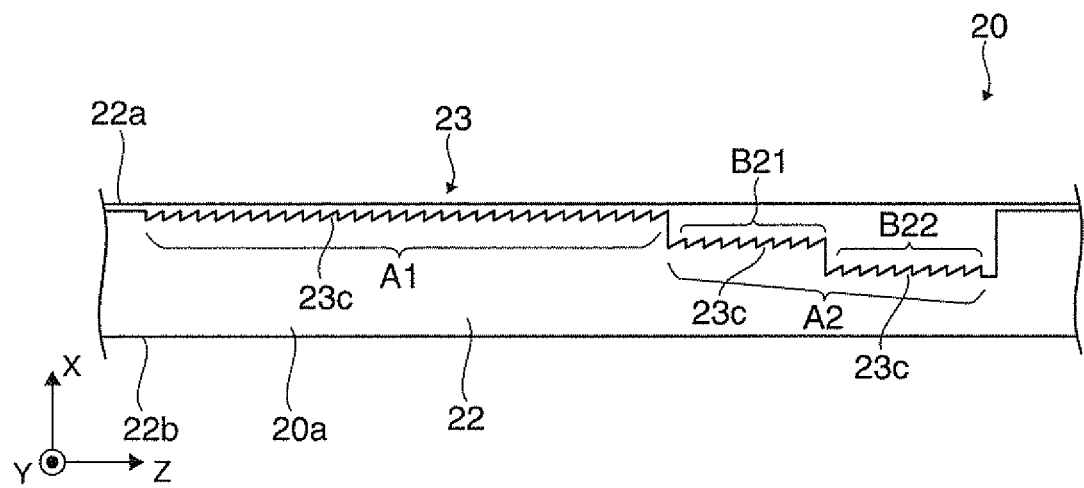
FIG. 7 is a sectional view illustrating essential parts of a virtual image display apparatus according to a second embodiment.

In the light guide plate 20 of the second embodiment shown in FIG. 7, the partial zone A2 has plural split zones B21 and B22 extending parallel to the extending plane of the first total reflection surface 22a. Each of the split zones 21B and 22B extends closely and parallel to the first total reflection surface 22a. However, the distance from the reflection surfaces 23a and 23b of the reflection units 23c constituting the split zone B22 on the reflected light incident part side to the light exiting surface OS is shorter than the distance from the reflection surfaces 23a and 23b of the reflection units 23c constituting the split zone B21 on the light incident part side to the light exiting surface OS. Consequently, the distance from the reflection surfaces 23a and 23b of the reflection units 23c of the image extraction part 23 to the light exiting surface OS is shorter on the reflected light incident part side than on the light incident part side in relation to Z direction, which is the arraying direction of the reflection units 23c. Again, with such a light guide plate 20, luminous fluxes that leak out toward the reflected light incident part side without being bent by the image extraction part 23 can be reduced.

Figure 8A:
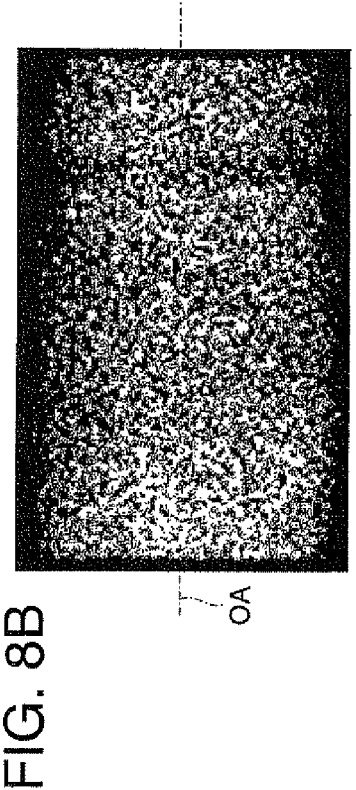
FIG. 8A and FIG. 8C illustrate two-dimensional luminance distribution and sectional luminance distribution of an image formed by the virtual image display apparatus of the second embodiment.
Figure 8B:
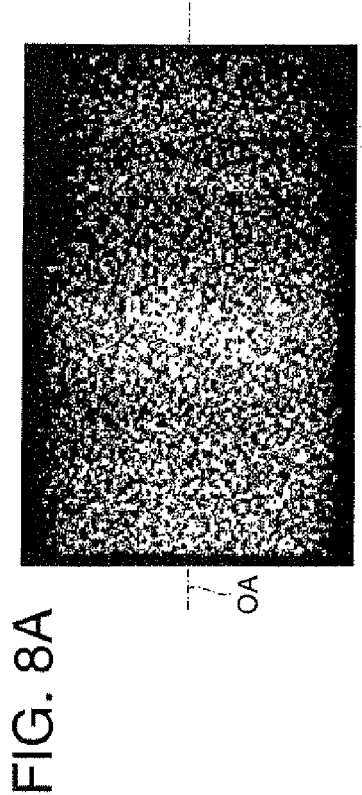
FIG. 8B and FIG. 8D illustrate two-dimensional luminance distribution and sectional luminance distribution of an image formed by the virtual image display apparatus of the first embodiment.
Figure 8C:
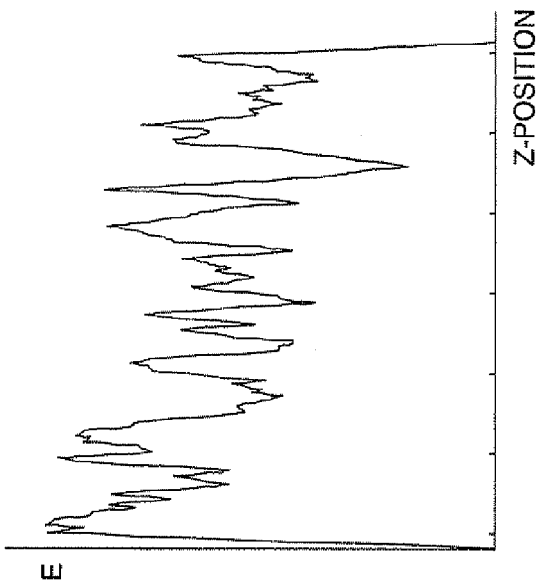
Figure 8D:
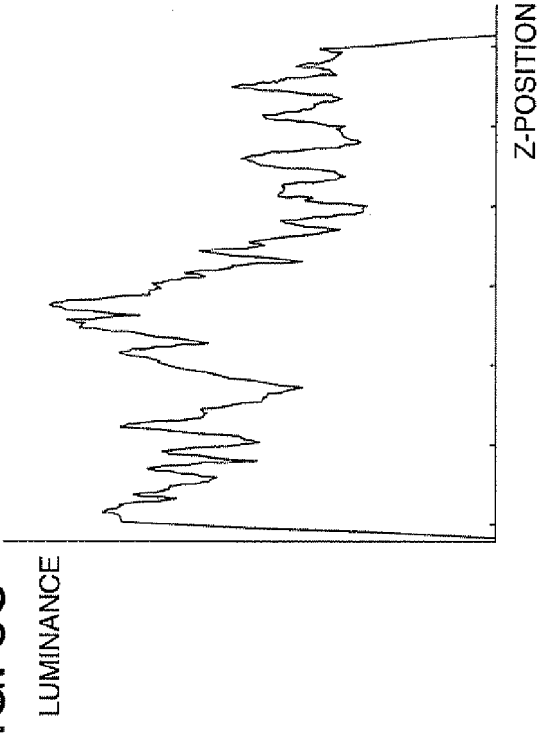

FIG. 8A illustrates two-dimensional luminance distribution of image light formed by the virtual image display apparatus 100 of the second embodiment. FIG. 88 illustrates two-dimensional luminance distribution of the image light according to the first embodiment, corresponding to FIG. 5A. FIG. 8C is a graph showing luminance distribution in Z direction along the optical axis OA of the image light formed by the virtual image display apparatus 100 of the second embodiment. FIG. 8D is a graph showing luminance distribution in Z direction along the optical axis OA of the image light according to the first embodiment, corresponding to FIG. 5C. With the virtual image display apparatus 100 of the second embodiment, too, occurrence of uneven luminance is reduced to a comparable level to the virtual image display apparatus 100 of the first embodiment.

The light guide plate 20 of the second embodiment as described above is less advantageous than the first embodiment in terms of uneven luminance because a step is formed between the split zones B21 and B22. However, since the split zones B21 and B22 are arranged parallel to the light exiting surface OS and adjusting the step can suffice, it can be said that the production of the light guide plat 20 is relatively easy.

Others

While the invention is described above with reference to embodiments, the invention is not limited to the embodiments and can be carried out in various forms without departing from the scope of the invention. For example, the following modifications can be made.

First, the basic zone A1 arranged on the light incident part side of the image extraction part 23 may not necessarily extend parallel to the extending plane of the first total reflection surface 22a and can be slightly inclined to be slightly away from the extending plane of the first total reflection surface 22a on the reflected light incident part side.

Moreover, in the above description, the reflection surfaces 23a and 23b of a reflection unit 23c that is in close proximity to and on the reflected light incident part side from a specific reflection unit 23c constituting the image extraction part 23 are at an equal distance to or closer to the light exiting surface OS, compared with the reflection surfaces 23a and 23b of the specific reflection unit 23c. Although such arrangement is basically desired, the reflection surfaces 23a and 23b of some reflection units 23c in a particular part may be slightly more away from the light exiting surface OS than are the reflection surfaces 23a and 23b of the specific reflection unit 23c that is closer to the light incident part side.

The pitch PT at which the reflection units 23c constituting the image extraction part 23 are arrayed is not limited to the same pitch between all the first reflection surfaces 23a, but may include cases where each pitch PT is different to a certain degree.

The direction of the reflection units 23c constituting the image extraction part 23 is not limited to the illustrated direction and can be adjusted by slight rotation about Y-axis. In this case, the directions of all the reflection units 23c need not be accurately coincident with each other as long as all the reflection units 23c have the same relative angle α.

In the above description, the transmitting-type liquid crystal device 11 is used as the image display device. However, not only the transmitting-type liquid crystal device but also various devices can be used as the image display device. For example, a configuration using a reflection-type liquid crystal panel can be employed, and a digital micro-mirror device or the like can be used instead of the liquid crystal device 11. Moreover, a configuration using a self-luminous device represented by an LED array, OLED (organic EL) or the like can also be employed. Furthermore, a configuration using a laser scanner having a laser light source in combination with a polygon mirror or another type of scanner can also be employed. In the liquid crystal device 11 and its light source, luminance patterns can be adjusted in consideration of light extraction characteristics of the image extraction part 23.

In the above description, the virtual image display apparatus 100 has the sets of the image forming device 10 and the light guide plate 20, one set corresponding to the right eye and the other corresponding to the left eye. However, the virtual image display apparatus 100 may also be configured with the image forming device 10 and the light guide plate 20 only for one of the left and right eyes so that the image is viewed by one eye.

In the above description, the see-through-type virtual image display apparatus is described. However, when the observer does not need to observe external images, the light reflectance of both the first and second reflection surfaces 23a and 23b can be substantially 100%.

In the above description, the light incident surface IS and the light exiting surface OS are arranged on the same plane. However, without being limited to this arrangement, for example, the light incident surface IS can be arranged on the same plane with the first total reflection surface 22a, and the light exiting surface OS can be arranged on the same plane with the second total reflection surface 22b.

In the above description, the angle of the slant surface RS of the mirror layer 21a constituting the incident light bending part 21 is not particularly mentioned. According to the invention, the angle of the mirror layer 21a or the like with respect to the optical axis OA takes various values according to applications and specifications.

In the above description, the V-shaped groove of the reflection unit 23c is shown as having a pointed end. However, the shape of the V-shaped groove is not limited to this example and the end may be cut flatly or R may be provided at the end.

In the above, the specific descriptions are given on the assumption that the virtual image display apparatus 100 of the embodiments is a head mounted display. However, the virtual image display apparatus 100 of the embodiments can also be altered into a head-up display.

In the above description, the first and second total reflection surfaces 22a and 22b are configured to reflect totally and guide image light by their interface with air, without providing a mirror or half-mirror on the surface. However, the total reflection in the invention of this application may include reflection by a mirror coat or half-mirror film formed on the whole or part of the first and second total reflection surfaces 22a and 22b. For example, such reflection may include a case where when the incident angle of image light satisfies total reflection conditions, a mirror coat or the like is provided on the whole or part of the total reflection surfaces 22a and 22b so as to reflect substantially the entire image light. Moreover, if image light with sufficient brightness can be provided, the whole or part of the total reflection surfaces 22a and 22b may be coated by a slightly transmissive mirror.

The entire disclosure of Japanese Patent Application No. 2010-197437, filed Sep. 3, 2010 is expressly incorporated by reference herein.

What is claimed is:

1. A light guide plate comprising:
   a light incident part which takes image light to inside;
   a light guide part which has first and second total reflection surfaces extending to face each other and guides the image light taken in from the light incident part by total reflection on the first and second total reflection surfaces;
   an image extraction part which includes plural reflection units arrayed in a predetermined arraying direction and having a first reflection surface and a second reflection surface forming a predetermined angle with the first reflection surface, and which enables extraction of the image light to outside by bending an optical path in the reflection units so that the image light guided by the light guide part is reflected by the first reflection surface and the image light reflected by the first reflection surface is further reflected by the second reflection surface; and
   a light exiting part having a light exiting surface which emits, to outside, the image light passed through the image extraction part;
   wherein a space between the first and second reflection surfaces of the reflection units of the image extraction part and the light exiting surface is broader on the light incident part side than on a reflected light incident part side, and wherein the first reflection surface is perpendicular to the first total reflection surface, and the first reflection surface is perpendicular to the second total reflection surface.

2. The light guide plate according to claim 1, wherein the first and second reflection surfaces of at least one or more reflection units of the image extraction part are arranged at a position closer to the light exiting surface to reflect more of the image light toward the light exiting part, compared with the first and second reflection surfaces of other reflection units arranged more toward the light incident part side than the at least one or more reflection units.

3. The light guide plate according to claim 1, wherein the first and second reflection surfaces of the reflection unit arranged most closely to a reflected light incident part side of the image extraction part are arranged at a position closer to the light exiting surface than are the first and second reflection surfaces of the reflection unit arranged most closely to the light incident part side of the image extraction part.

4. The light guide plate according to claim 1, wherein in a partial zone on a reflected light incident part side in relation to the predetermined arraying direction, of the image extraction part, the first and second reflection surfaces of the reflection units are arranged at a position closer to the light exiting surface as these reflection surfaces are situated toward the reflected light incident part side.

5. The light guide plate according to claim 4, wherein in a basic zone closer to the light incident part side than is the partial zone, of the image extraction part, the first and second reflection surfaces of the reflection unit are arranged to keep a constant space to the light exiting surface.

6. The light guide plate according to claim 4, wherein the first and second reflection surfaces of the reflection units in the partial zone are arranged along an inclined flat surface that is inclined by a predetermined angle in relation to a predetermined inclination direction from a state parallel to the first total reflection surface.

7. The light guide plate according to claim 4, wherein the first and second reflection surfaces of the reflection units in the partial zone are arranged along a curved surface that is inclined in relation to a predetermined inclination direction from a state parallel to the first total reflection surface and has a changing inclination angle.

8. The light guide plate according to claim 7, wherein the first and second reflection surfaces of the reflection units in the partial zone are arranged along a curved surface which has an inclination angle to the first total reflection surface increasing toward the reflected light incident part side in relation to the predetermined arraying direction.

9. The light guide plate according to claim 1, wherein the first and second reflection surfaces of at least one reflection unit on a reflected light incident part side, of the image extraction part, are arranged closer to the light exiting surface than to the first total reflection surface.

10. The light guide plate according to claim 1, wherein the first and second reflection surfaces of at least one reflection unit on the light incident part side, of the image extraction part, are arranged closer to the first total reflection surface than the second total reflection surface.

11. A virtual image display apparatus comprising:
the light guide plate according to claim 1; and
an image forming device which forms the image light guided by the light guide plate.

12. A virtual image display apparatus comprising:
the light guide plate according to claim 2; and
an image forming device which forms the image light guided by the light guide plate.

13. A virtual image display apparatus comprising:
the light guide plate according to claim 3; and
an image forming device which forms the image light guided by the light guide plate.

14. A virtual image display apparatus comprising:
the light guide plate according to claim 4; and
an image forming device which forms the image light guided by the light guide plate.

15. A virtual image display apparatus comprising:
the light guide plate according to claim 5; and
an image forming device which forms the image light guided by the light guide plate.

16. A virtual image display apparatus comprising:
the light guide plate according to claim 6; and
an image forming device which forms the image light guided by the light guide plate.

17. A virtual image display apparatus comprising:
the light guide plate according to claim 7; and
an image forming device which forms the image light guided by the light guide plate.

18. A virtual image display apparatus comprising:
the light guide plate according to claim 8; and
an image forming device which forms the image light guided by the light guide plate.

19. A virtual image display apparatus comprising:
the light guide plate according to claim 9; and
an image forming device which forms the image light guided by the light guide plate.

20. A virtual image display apparatus comprising:
the light guide plate according to claim 10; and
an image forming device which forms the image light guided by the light guide plate.

21. The light guide plate according to claim 1, wherein the image extraction part further includes:
a first zone of the plural reflection units arranged in a row that is parallel to the first total reflection surface and the second total reflection surface, the first zone of the plural reflection units being arranged at a first distance away from the first total reflection surface; and
a second zone of the plural reflection units arranged in a row that is parallel to the first total reflection surface and the second total reflection surface, the second zone of the plural reflection units being arranged at a second distance away from the first total reflection surface, the second distance being different than the first distance.

* * * * *